US009148644B2

(12) United States Patent
Nayak et al.

(10) Patent No.: US 9,148,644 B2
(45) Date of Patent: Sep. 29, 2015

(54) SYSTEM FOR DETECTING STRUCTURED ARTIFACTS IN VIDEO SEQUENCES

(71) Applicant: Tektronix, Inc., Beaverton, OR (US)

(72) Inventors: Arvind Nayak, Bangalore (IN); G. V. Varaprasad, Bangalore (IN)

(73) Assignee: TEKTRONIX, INC., Beaverton, OR (US)

( * ) Notice: Subject to any disclaimer, the term of this patent is extended or adjusted under 35 U.S.C. 154(b) by 40 days.

(21) Appl. No.: 14/106,143

(22) Filed: Dec. 13, 2013

(65) Prior Publication Data

US 2014/0169763 A1    Jun. 19, 2014

(30) Foreign Application Priority Data

Dec. 14, 2012  (IN) .......................... 3534/MUM/2012

(51) Int. Cl.
*H04N 9/80* (2006.01)
*H04N 9/88* (2006.01)
*G06T 5/00* (2006.01)
*G06T 5/20* (2006.01)
*G11B 7/09* (2006.01)

(52) U.S. Cl.
CPC *H04N 9/88* (2013.01); *G06T 5/002* (2013.01); *G06T 5/20* (2013.01); *G11B 7/0948* (2013.01); *G06T 2207/20032* (2013.01); *G06T 2207/20056* (2013.01)

(58) Field of Classification Search
USPC .................................. 386/223–227, 242, 248
See application file for complete search history.

(56) References Cited

U.S. PATENT DOCUMENTS

| | | | | |
|---|---|---|---|---|
| 6,282,307 | B1 * | 8/2001 | Armato et al. ................ | 382/132 |
| 6,333,990 | B1 * | 12/2001 | Yazici et al. .................. | 382/132 |
| 2003/0133623 | A1 * | 7/2003 | Lee et al. ...................... | 382/270 |
| 2006/0256226 | A1 * | 11/2006 | Alon et al. .................... | 348/335 |
| 2008/0074552 | A1 * | 3/2008 | Jung et al. .................... | 348/663 |
| 2008/0122974 | A1 | 5/2008 | Adams | |
| 2009/0103812 | A1 | 4/2009 | Diggins | |
| 2010/0158332 | A1 * | 6/2010 | Rico et al. .................... | 382/128 |

OTHER PUBLICATIONS

Ren, J: "Detection of Dirt Impairments from Archived Film Sequences: Survey and Evaluations", Optical Engineering Jun. 2010 SPIE USA, vol. 49, No. 6, XP040514664.
European Search Report and Written Opinion for Application No. 13197068.3, dated Apr. 11, 2014, 7 pages.

* cited by examiner

*Primary Examiner* — Nigar Chowdhury
(74) *Attorney, Agent, or Firm* — Michael A. Nelson; Marger Johnson

(57) ABSTRACT

Methods for detecting structured artifacts in a video may begin by accepting a video frame at a video input and then generating a filtered frame from the video frame. After a differenced image is produced, groups of connected pixels (blobs) within the differenced frame are identified, and isolated blobs are removed to produce a cleaned image. A Fourier transform is performed on the cleaned image, and structured artifacts may be identified based on a comparison of magnitudes of the Fourier components of the cleaned image. Devices that detect and identify structured artifacts are also described.

12 Claims, 6 Drawing Sheets

SYSTEM FOR DETECTING STRUCTURED ARTIFACTS IN VIDEO SEQUENCES

RELATED APPLICATION

This U.S. non-provisional application claims priority to Indian Application No. 3534/MUM/2012, filed Dec. 14, 2012, which is incorporated by reference hererin.

FIELD OF THE INVENTION

This disclosure is directed toward analysis of video, and, more particularly, to detecting structured artifacts in parts of a video frame.

BACKGROUND

A video or video stream is a collection of sequential image frames. Occasionally, due to any of a number of reasons, artifacts may appear in portions of a video frame. Sometimes artifacts are produced by dropouts caused when a video is read from an imperfect portion of video tape. Imperfections may be caused by defects in the magnetic tape particles, tape aging, damage to the tape, dirt, or worn video heads, for instance. In other cases artifacts may appear that were not caused by tape defects, but could be caused by other means, and even in completely digital systems.

As used herein, artifacts may be considered to be a group of affected pixels of a video frame. The group is typically rectangular in shape, and the pixels within structured artifacts form patterns. The patterns may include, for example, alternating horizontal or vertical lines, or alternating pixels in a 2-D array pattern similar to a checkerboard, or their variants. FIG. 1 illustrates example structured artifacts. As seen in FIG. 1, a frame 5 includes multiple artifacts 8, a specific example of which is identified as an area 10. Typically the frame 5 would be filled with image data, and a few or several artifacts 8. As seen in the exploded section, an artifact 15 consisting of alternating horizontal lines may fill the area 10. This artifact may have been caused by a tape dropout, or by other means as described above.

FIG. 2 illustrates other artifact shapes that may fill any of the artifacts 8 of FIG. 1. For example artifact shapes may include vertical lines 25, a series of individual pixels 35, or a combination of vertical and horizontal lines and pixels, as illustrated by 45, 55, 65, and 75. The artifact patterns generally have a noticeable contrast when compared to surrounding unaffected pixels.

Small artifacts may go completely unnoticed by the viewer upon playback because standard error correction techniques may compensate for the artifacts. Large artifacts, however, are noticeable by viewers. Sometimes artifacts appear in a number of successive frames. Artifacts negatively affect the viewer experience by distracting the viewer from the content of the video itself.

Embodiments of the invention address these and other limitations of the prior art.

SUMMARY OF THE INVENTION

Aspects of the invention include methods for detecting structured artifacts in a video. The method may accept a video frame at a video input and then generating a filtered frame from the video frame. Next, the filtered frame from the accepted frame may be differenced to create a differenced frame. Then groups of connected pixels within the differenced frame are identified, and isolated groups are removed to produce a cleaned image. A Fourier transform is performed on the cleaned image, and structured artifacts may be identified based on a comparison of magnitudes of the Fourier components of the cleaned image.

Other aspects of the invention include a video artifact detecting device for detecting structured artifacts in a video. The detecting device includes, for example, a video input for accepting a video frame, a filter, and a difference generator structured to generate a difference image from the video frame and the video frame that has been filtered through the filter. The device also includes a blob identifier structured to identify groups of connected pixels within the differenced frame as blobs, and a blob cleaner structured to remove isolated blobs to produce a cleaned image. A Fourier transformer is present for producing an output from the cleaned image. The device further includes an identifier structured to detect the video frame as having structured artifacts based on a comparison of magnitudes of Fourier components of the cleaned image.

DETAILED DESCRIPTION

Figure 1:
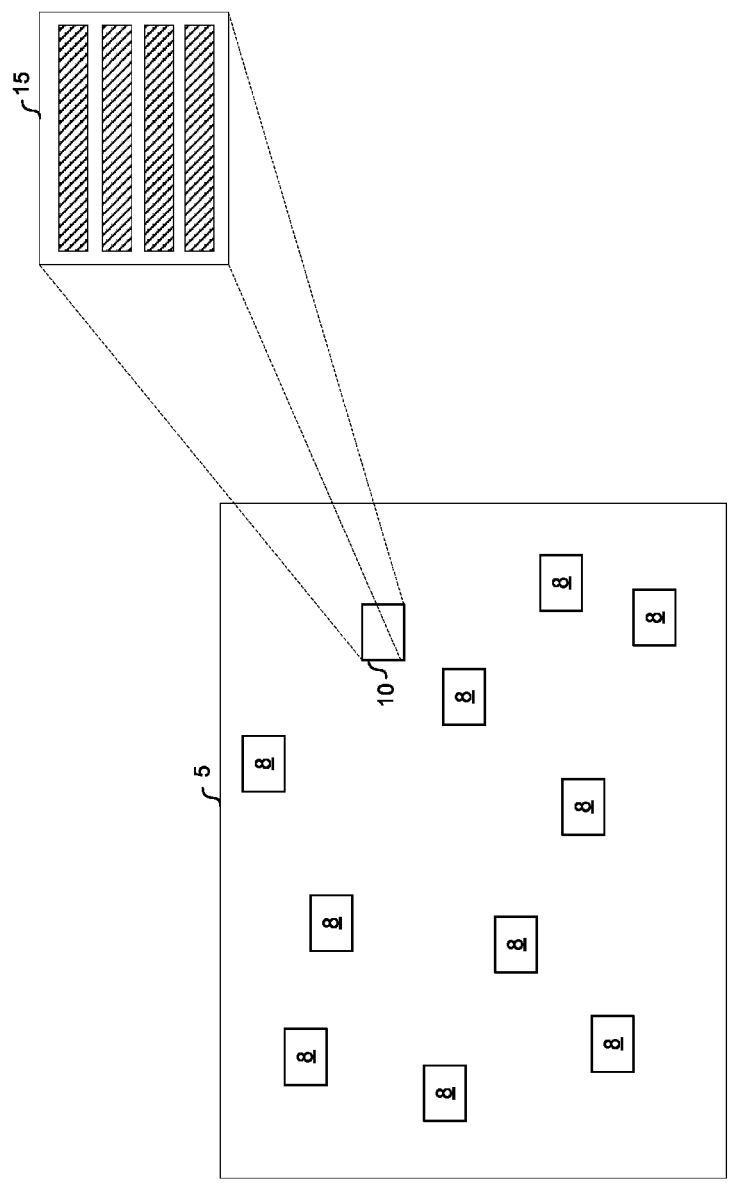
FIG. 1 illustrates a video frame having an example structured artifact.
Figure 2:
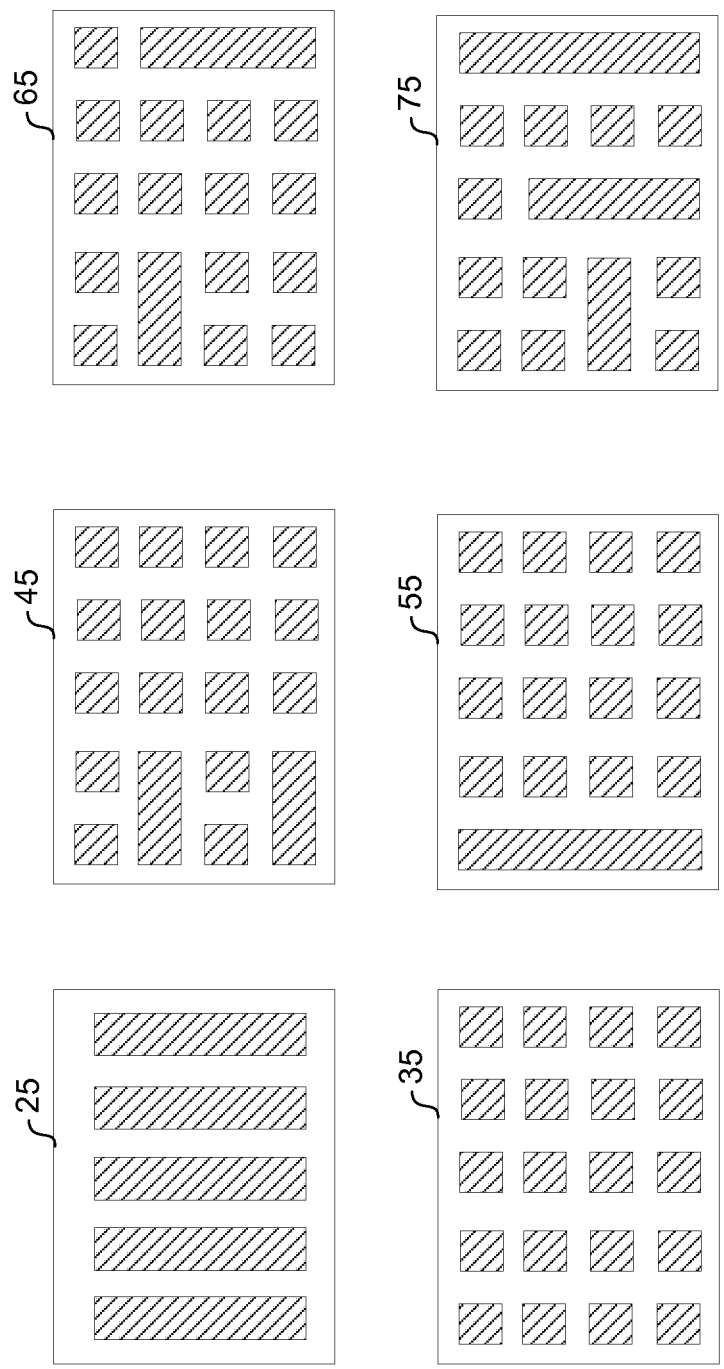
FIG. 2 illustrates example structured artifacts that may be identified using embodiments of the invention.
Figure 3:
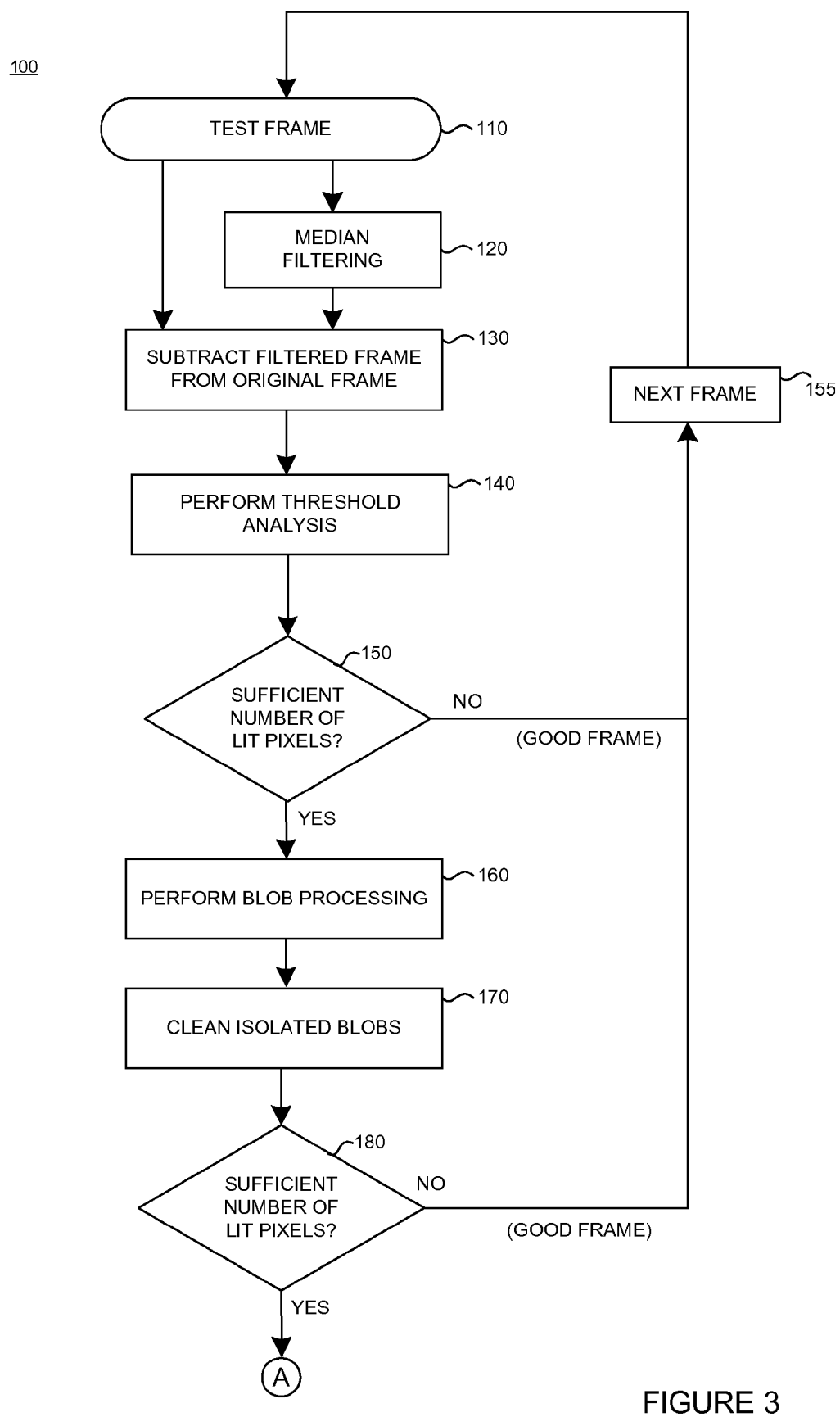
FIG. 3 is flowchart illustrating a first part of an example method of detecting structured artifacts in a video according to embodiments of the invention.

In FIG. 3 luma components of a frame of video 110 that is being tested for artifacts is passed to a filtering stage 120, such as by a 3×3 median filter. Of course both luma and chroma components may be processed and other filters may be used with good results.

After being filtered by the filter in the operation 120, a differencing operation 130 generates a difference image from subtracting filtered image from the original frame 110. This may be performed by pixel-wise subtraction.

A thresholding operation 140 may then occur. For example, every value of the difference image is compared to a threshold value. Any value greater than the threshold may be set to 255, for instance, and any value less than the threshold may be set to 0. The 255 value may also be referred to as 'lit,' while the 0 value is referred to as un-lit. The output of the operation 140 may be referred to as a binary image, because its values are either 0 or 255 (lit or un-lit), and no pixel values in the binary image appear between these values.

Next, a determination operation 150 determines if the number of lit pixels in the binary frame is above or below a threshold. If the number of lit pixels in the binary image is below the threshold, then the test frame 110 is deemed to be a good frame, and the flow 100 exits the operation 150 in the NO direction. An operation 155 increments to the next frame. If instead greater than the threshold number of pixels are lit in the binary frame, then the flow 100 exits in the YES direction.

Typically, the threshold in the operation 150 is set between approximately 32-64 pixels for high sensitivity. The threshold number may be increased based on the sensitivity desired by the user.

A blob process operation 160 generates information about the binary image. An individual unconnected pixel or group of connected pixels in the binary image is termed a "blob." In one embodiment the group of connected pixels is determined by using an 8-connectivity analysis. Each blob has a unique label, such as an index. The blob processing of operation 160 additionally generates a centroid of each blob and calculates the area of each blob. The blob processing operation 160 may further generate a list of pixel coordinates for each pixel within each blob and a bounding box for each blob.

A cleaning operation 170 removes isolated blobs. In one embodiment, all blobs having an area of four pixels or less that are also at least two pixels from the next nearest blob are removed. Removed in the context of the binary image means having the value set to zero. In this scenario, blobs larger than four pixels or those that are within two pixels from the nearest blob are not cleaned. Of course, the size of the blobs cleaned and the distance from the nearest blob are implementation factors and are not limits of the invention.

Figure 4:
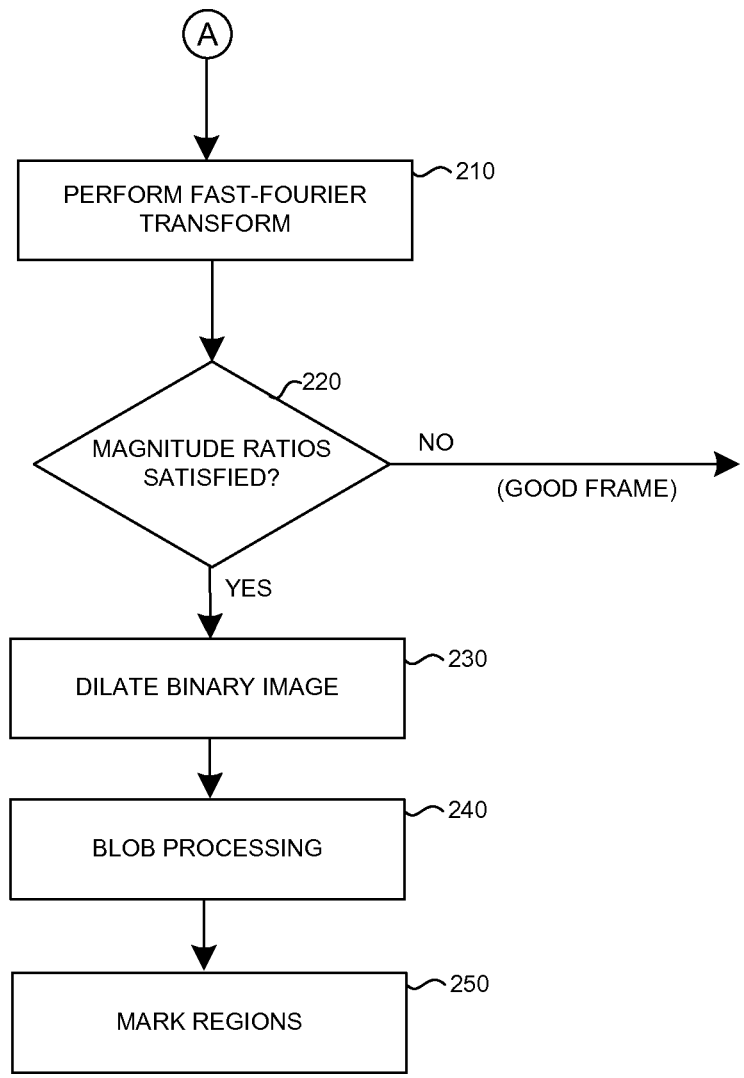
FIG. 4 is flowchart illustrating a second part of the example method of detecting structured artifacts in a video according to embodiments of the invention.

After the isolated blobs have been removed in the cleaning operation 170, the cleaned binary image is again checked against a threshold number of lit pixels, similar to the operation 150 described above. Typically, the same threshold value is used for both threshold evaluation operations 150, 180. If the cleaned binary image has fewer than the threshold number of lit pixels, then the flow 100 exits in the NO direction and the frame is labeled as good, i.e., as not having structured artifacts, or not having enough structured artifacts to be so labeled. Then the next frame is incremented in the operation 155. If instead the binary image still contains over the threshold amount of lit pixels, the flow 100 exits the operation 180 in the YES direction, and the flow continues as illustrated in FIG. 4.

A transform, such as a two-dimensional Fast-Fourier transform is performed on the cleaned binary image at operation 210. This transform generates component magnitudes, such as those illustrated in FIG. 5.

Figure 5:
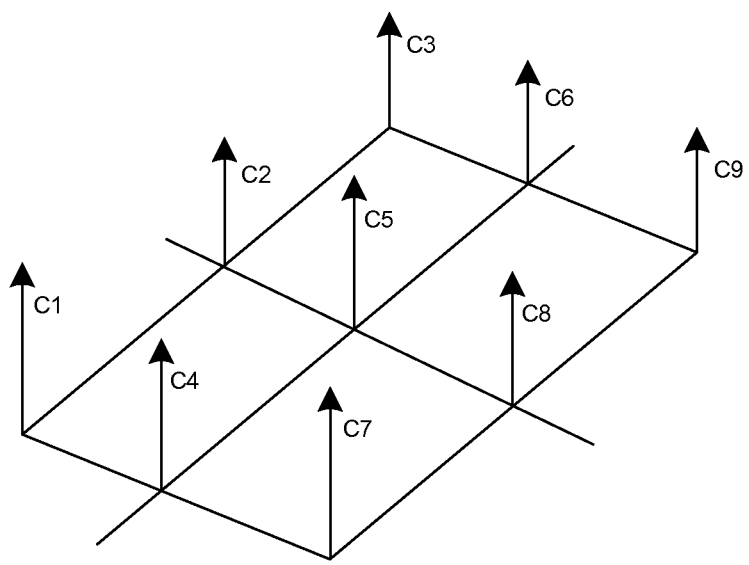
FIG. 5 is a diagram illustrating magnitudes of calculated Fourier components according to embodiments of the invention.

In FIG. 5, component $c_5$ represents zero frequency and the remaining components $c_1$-$c_4$, $c_6$-$c_9$, represent highest spatial frequencies, both positive and negative, in horizontal, vertical and diagonal directions, i.e., lit pixels separated by one unlit pixel-wide gap in either or both directions. Several ratios are then computed:

$r_1 = c_5/c_1$
$r_2 = c_5/c_2$
$r_3 = c_5/c_3$
$r_4 = c_5/c_4$
$r_5 = c_5/c_5$
$r_6 = c_5/c_6$
$r_7 = c_5/c_7$
$r_8 = c_5/c_8$
$r_9 = c_5/c_9$

Artifacts may be determined to be present based on these ratios. For example, if ratios ($r_1$ & $r_2$ & $r_3$) OR ($r_4$ & $r_5$ & $r_6$) OR ($r_7$ & $r_8$ & $r_9$) OR ($r_1$ & $r_4$ & $r_7$) OR ($r_2$ & $r_5$ & $r_8$) OR ($r_3$ & $r_6$ & $r_9$) fall between a lower and an upper limit then it may be determined that artifacts are present in the tested frame. In one embodiment the lower limit may be 0.99 and the upper limit may be 3. Limits may be empirically determined.

If the ratios do not fall within the limits as described above, the flow 100 exits the operation 220 in the NO direction and the frame is labeled as good, i.e., one that does not contain artifacts.

If instead it is determined that the tested frame does contain artifacts, then the operations 230, 240, and 250 serve to mark the regions within the tested frame.

In an operation 230, the cleaned binary image is dilated in an operation that merges affected pixels into regions. In one embodiment, this merger is performed using morphological dilation of the cleaned binary image. In other embodiments the morphological dilation may be performed multiple times, such as three times. Each new blob formed after the morphological dilation now has a bounding box close to the artifact block as perceived by a human viewer. A human viewer perceives an artifact block as a single block although it may be made of many individual blobs not physically connected. After the morphological dilation, blobs now include a bounding box close to the artifact block as perceived by the human viewer.

In a next operation 240, blob processing is performed the same or similar to how it was performed in the operation 160 described above, but is performed on the dilated binary image. Centroids, bounding boxes and areas are again calculated, and are used to mark the affected regions of the original test frame in an operation 250.

Figure 6:
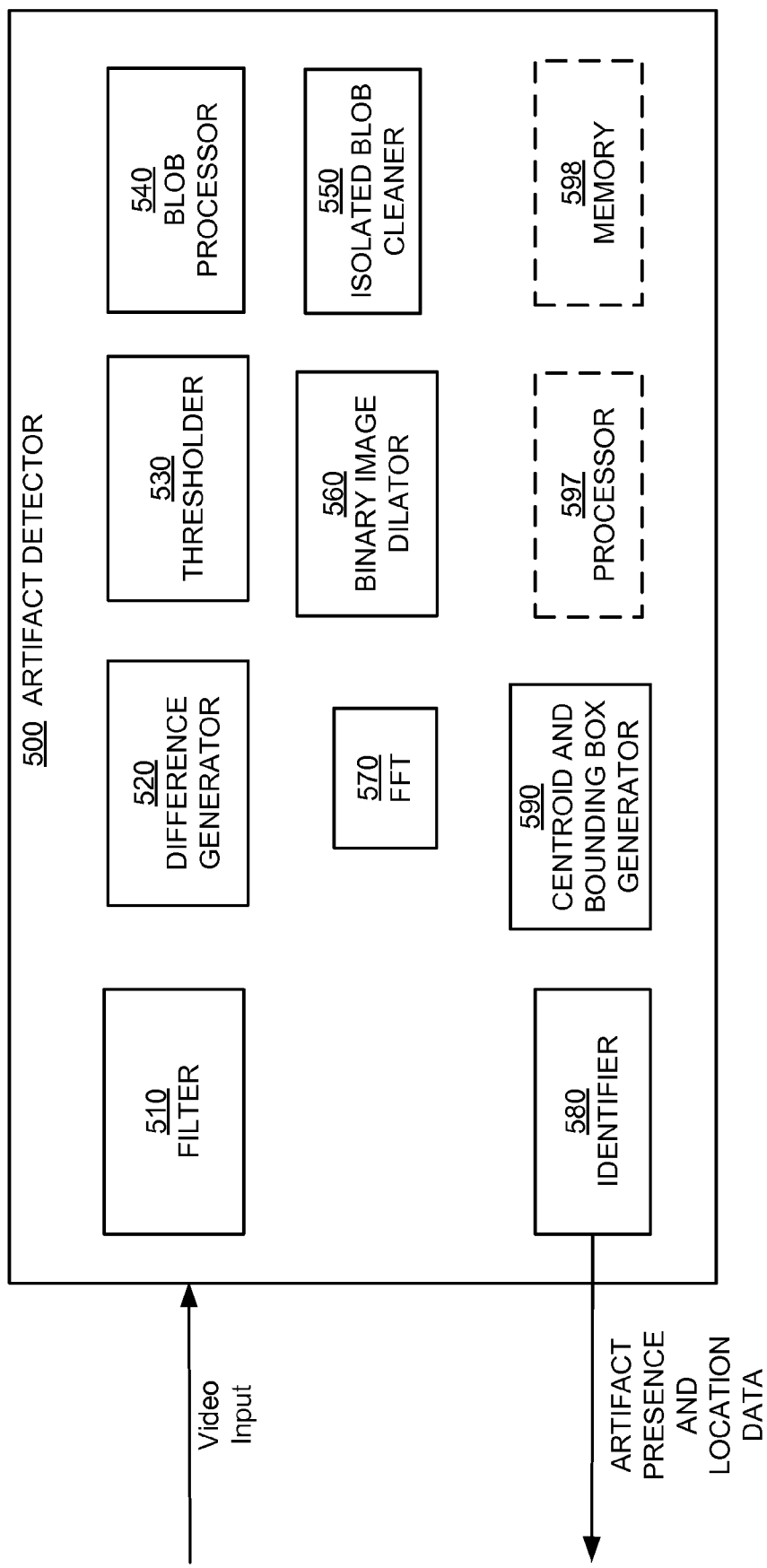
FIG. 6 is a block diagram illustrating components of an artifact detector for video according to embodiments of the invention.

FIG. 6 is a block diagram illustrating components of an example artifact detector for video according to embodiments of the invention. Any of the components of an artifact detector 500 may be implemented in hardware, firmware, by a programmed processor, or any other method as is known in the art. For example the illustrated components may be performed by a processor 597 programmed by instructions and/or data stored in a related memory 598.

An artifact detector 500 may include an input for accepting one or more video frames. A filter 510 is used to filter the frame, as described above. The difference generator 520 generates a difference frame from the filtered frame and the original frame. The thresholder 530 generates a binary image from the differenced frame.

A blob processor 540 operates on the binary image as described with reference to operation 160 above. Once processed by the blob processor, then isolated blobs may be cleaned in the blob cleaner 550. A transformer, such as an FFT 570 performs a transform on the cleaned image.

An identifier 580 determines whether the frame includes artifacts by evaluating the output of the FFT 570. If the frame includes artifacts, the cleaned binary image may be dilated in a binary image dilator 560, as described above. Then, the identifier 580, or portions of the identifier 580 and the centroid and bounding box generator 590, mark the regions of the original frame that include the detected artifacts.

Thus, embodiments of the invention include a method for detecting structured artifacts in a video. The method includes accepting a video frame at a video input, generating a filtered frame from the video frame, differencing the filtered frame from the accepted frame to create a differenced frame, identifying groups of connected pixels within the differenced frame as blobs, removing isolated blobs to produce a cleaned image, performing Fourier transform on the cleaned image, and identifying the video frame as having structured artifacts based on a comparison of magnitudes of Fourier components of the cleaned image. The video may then be marked as containing artifacts, and the artifact locations also produced.

Embodiments also include a video artifact detecting device for detecting structured artifacts in a video. The detector includes a video input for accepting a video frame, a filter, a difference generator structured to generate a difference image from the video frame and the video frame that has been filtered through the filter, a blob identifier structured to identify groups of connected pixels within the differenced frame as blobs, a blob cleaner structured to remove isolated blobs to produce a cleaned image, a Fourier transformer for producing an output from the cleaned image, and an identifier structured to detect the video frame as having structured artifacts based on a comparison of magnitudes of Fourier components of the cleaned image. Other embodiments further include a thresholder for generating a thresholded output of the differenced frame. Other embodiments further include a binary image dilator and a centroid and bounding box generator.

In various embodiments, components of the invention may be implemented in hardware, software, or a combination of the two, and may comprise a general purpose microprocessor, a digital signal processor (DSP), an application specific integrated circuit (ASIC), a field-programmable gate array (FPGA), or the like.

It will be appreciated from the forgoing discussion that the present invention represents a significant advance in the field of video frame evaluation. Although specific embodiments of the invention have been illustrated and described for purposes if illustration, it will be understood that various modifications may be made without departing from the spirit and scope of the invention. Accordingly, the invention should not be limited except as by the appended claims.

What is claimed is:

1. A method for detecting structured artifacts in a video, comprising:
   accepting a video frame at a video input;
   generating a filtered frame from the video frame;
   differencing the filtered frame from the accepted frame to create a differenced frame;
   thresholding the differenced frame;
   comparing the thresholded differenced frame to a threshold minimum value of lit pixels in the frame to determine if the video frame contains a structured artifact;
   identifying groups of connected pixels within the differenced frame as blobs;
   removing isolated blobs to produce a cleaned image;
   comparing a number of lit pixels in the cleaned image to the threshold minimum value of lit pixels;
   when the number of lit pixels in the cleaned image is greater than the threshold minimum value of lit pixels, performing Fourier transform on the cleaned image; and
   identifying the video frame as having structured artifacts based on a comparison of magnitudes of Fourier components of the cleaned image.

2. The method for detecting structured artifacts in a video according to claim 1, further comprising:
   marking regions of the video frame where the structured artifact occurs.

3. The method for detecting structured artifacts in a video according to claim 2, in which marking regions of the video frame where the structured artifact occurs comprises:
   thresholding the differenced frame to produce a binary image;
   dilating the binary image;
   identify blobs in the dilated binary image; and
   generating bounding boxes.

4. The method for detecting structured artifacts in a video according to claim 2, in which marking regions of the video frame where the structured artifact occurs comprises:
   thresholding the differenced frame to produce a binary image;
   dilating the binary image;
   identify blobs in the dilated binary image; and
   generating a centroid.

5. The method for detecting structured artifacts in a video according to claim 1, in which removing isolated blobs to produce a cleaned image comprises, when there are no blobs within two-pixel vicinity, and when the blob has an area less than four pixels, replacing each pixel in the blob with a 0.

6. A video artifact detecting device for detecting structured artifacts in a video, comprising:
   a video input for accepting a video frame;
   a filter;
   a difference generator structured to generate a difference image from the video frame and the video frame that has been filtered through the filter;
   a blob identifier structured to identify groups of connected pixels within the differenced frame as blobs;
   a thresholder for generating a thresholded output of the differenced frame;
   a blob processor structured to compare the thresholded output of the differenced frame to a threshold minimum value of lit pixels in the frame;
   a blob cleaner structured to remove isolated blobs to produce a cleaned image, when the number of lit pixels in the differenced frame is greater than the threshold minimum value of lit pixels, the blob processor further structured to compare a number of lit pixels in the cleaned image to the threshold minimum value of lit pixels;
   a Fourier transformer for producing an output from the cleaned image, when the number of lit pixels in the cleaned image is greater than the threshold minimum value of lit pixels; and
   an identifier structured to detect the video frame as having structured artifacts based on a comparison of magnitudes of Fourier components of the cleaned image.

7. The video artifact detecting device of claim 6, in which the blob cleaner is structured to, when there are no blobs within two-pixel vicinity, and when the blob has an area less than four pixels, replace each pixel in the blob with a 0.

8. The video artifact detecting device of claim 6, further comprising:
   an artifact marker structured to generate locations of one or more artifacts.

9. The video artifact detecting device of claim 8, in which the artifact marker comprises a binary image dilator.

10. The video artifact detecting device of claim 9, in which the artifact marker further comprises a centroid generator.

11. The video artifact detecting device of claim 9, in which the artifact marker further comprises a bounding box generator.

12. The video artifact detecting device of claim 6, in which the blob cleaner is structured to, when there are no blobs within two-pixel vicinity on each side, and when the blob has an area less than four pixels, replace each pixel in the blob with a 0.

* * * * *